May 21, 1940. H. I. STOLTZ 2,201,961
APPARATUS FOR RECOVERING OIL FROM EXHAUST MIXTURES
Filed Jan. 17, 1938 2 Sheets-Sheet 1
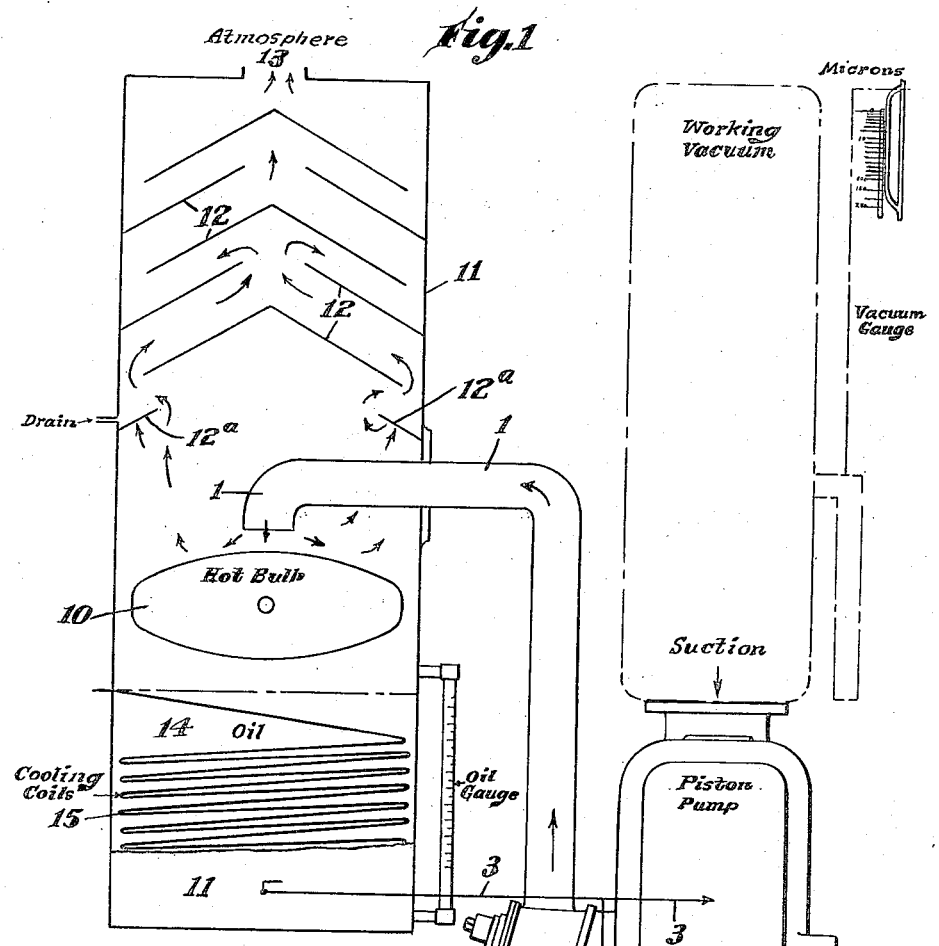
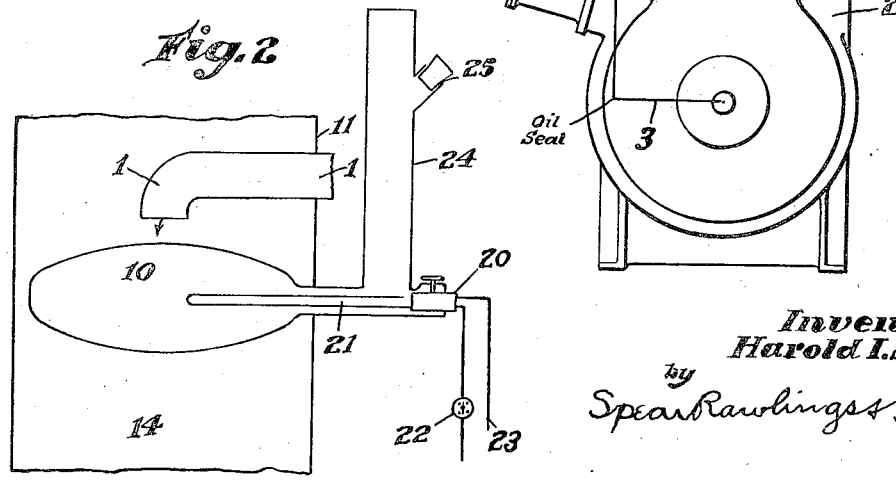
Inventor
Harold I. Stoltz
by Spear Rawlings & Spear
Attorneys

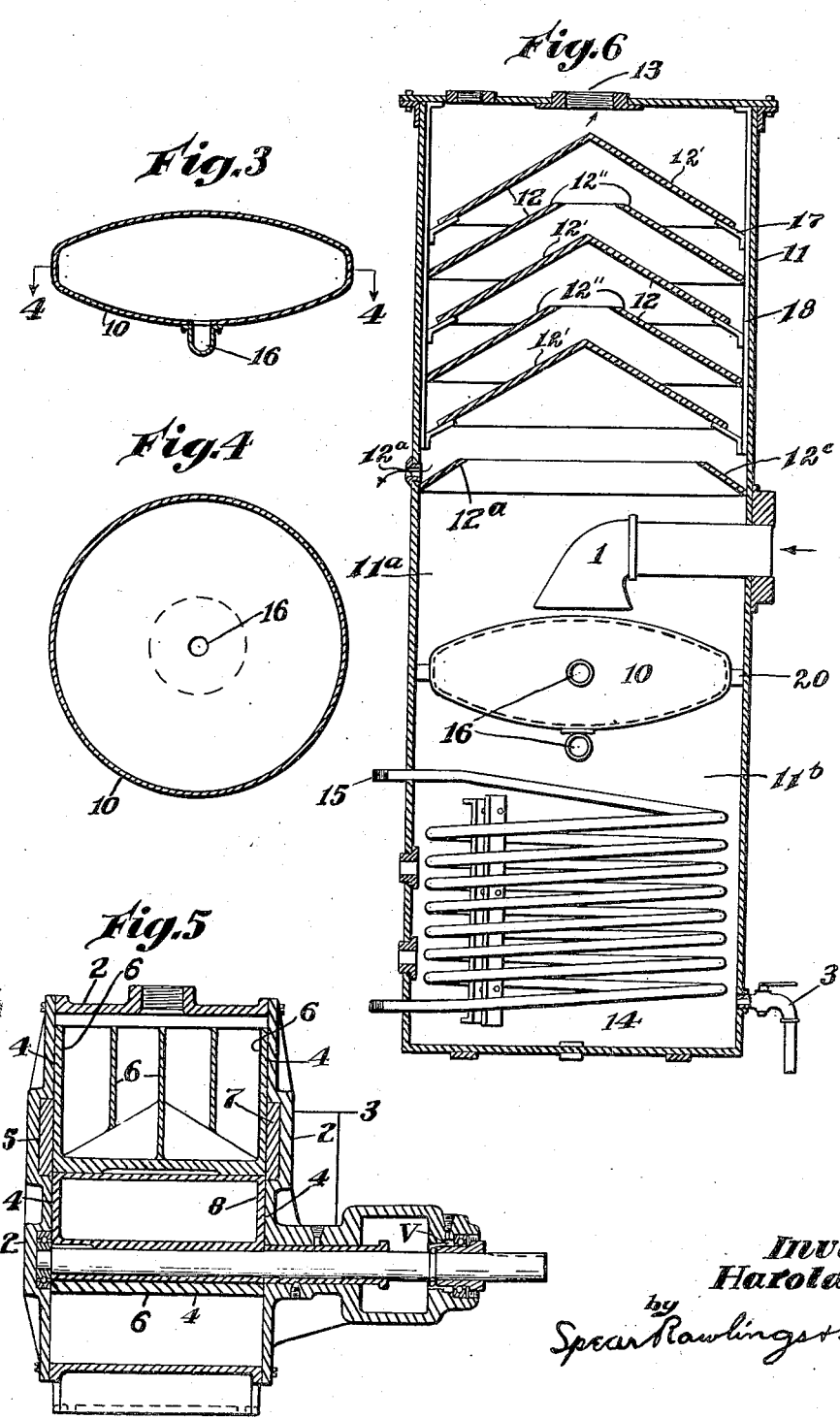

Patented May 21, 1940

2,201,961

UNITED STATES PATENT OFFICE 2,201,961

APPARATUS FOR RECOVERING OIL FROM EXHAUST MIXTURES

Harold I. Stoltz, Hyde Park, Mass., assignor to Kinney Manufacturing Company, Boston, Mass., a corporation of Massachusetts Application January 17, 1938, Serial No. 185,318

3 Claims. (Cl. 196—16)

In the formation of high vacua by pumps of piston type, great dependence has to be placed on the efficiency of a sealing medium, such as oil, for preventing leakages between moving parts. This has long been recognized and many improvements have been made in such pumps and the oil separator systems used with them.

My present invention relates to an improved means for recovering the sealing oil from the exhaust from such pumps. In spite of most serious efforts to free the usual sealing oil from its inevitable contamination by water or other vapors and gases, in practice there has been a return to the pump of such contaminations which seemed impossible to avoid or guard against.

In separators used in such systems it has been usual to provide for the condensation by cooling of such parts of the oil as became volatilized by overheating, but I have found that in so doing in certain operations, where for example the air handled by the pump carries a considerable water content, such tends to persist and come back through the separator to give trouble as extraneous vapor content in the oil seal and become extremely detrimental to the formation of high vacuums so that the oils have had to be retreated after passing the separator and before going back to the pump.

According to my present concept such vapor return is anticipated and its consequent ill effects avoided.

Both cooling and heating by coils or baffles have been used in the refining of oil, but in such systems there was no problem of super high vacuum or of continuous lubrication of a mechanically operating pump for forming or maintaining such atmospheric rarefication.

According to my concept water or vapor or like gases are separated from the oil in the exhaust mixture in a substantially atmospheric separator whereas heretofore they were usually merely condensed or precipitated usually by chilled baffles. According to my invention I evaporate the water and other vaporizable substances by a heated interception in advance of the oil reservoir and I convectively remove such vapors in the separator, rather than by a later separate step or handling, before returning the oil to the pump.

My invention may be variously practiced and many forms of apparatus used, but for the purposes of my present disclosure and discussion I refer to a simple apparatus of generally accepted type, but so arranged as to afford the basis of my novel efficiency in sealing oil maintenance for vacuum pumps. For such purposes I show a schematic layout of a system for the practice of my invention, details being obviously optional with the installing or designing engineer. In the drawings:

Fig. 1 is a schematic indication of the layout of a system according to my invention.

Fig. 2 is a schematic indication of a form of heating for the vaporizing bulb by an electric unit, or steam.

Fig. 3 is a central vertical section through my hot vaporizing bulbed condenser for such a system.

Fig. 4 is a transverse section on the indicated line 4—4, of Fig. 3, and

Fig. 5 is an indicated oil sealed piston pump of well known rotary type, and

Fig. 6 is a vertical section through the separator apparatus which I employ in my system.

In practicing my invention in connection with manufacturing operations, such as for example that of lamps, radio tubes, vacuum drying, distillation processes, the electric furnace refining of rare metals, as well as laboratory, chemical, engineering and medical service, and the many other fields requiring reliable high vacua on an efficient operating bases, I am able to avoid the contamination of the oil recovered from the pump discharge so that further treatment of the oil is unnecessary.

Referring to the schematic basis of Fig. 1 it will be seen that I lead the discharge 1 of a pump 2 oil sealed as at 3 to a separator casing 11 in which according to my method the discharge 1 is downwardly directed against a hot bulb 10. This is disposed in a separator casing 11 having baffle plates 12 obstructing the natural circulatory discharge as at 13. The oils of the discharge 1 from the pump 2 precipitate to a collection and stabilizing tank 14. Here the heat is neutralized as by coils 15 which cool it prior to its return to the pump sealing system as through 3, where it seals and lubricates the moving parts of the pump.

In Fig. 5 I have shown in section a typical pump of the cylinder type having indicated oil leads of standard but related construction. In this view a piston is indicated at 6 having a slide pin 7 operated by a cam 8. The oil seals 3 deliver to grooves or ducts as at 4 to the slide pin and for sealing at 5 to the side walls of the piston and lubricating its cam and other contact surfaces. For all these clean stabilized oil is important, but most important at the surfaces of the piston 6 where it contacts the interior of the casing generally indicated as 2.

The discharge of the matter exhausted from the pump from 1 downwardly and axially of the hot bulb 10 evaporates its water or other extraneous vapor content permitting part to escape by convection to the atmosphere and part to be condensed on the baffles 12 and collected as at 12a to be carried away to the sump. Any oil which may persist in the vapors even after their passage over the hot bulb 10 will ascend with the vapors and will condense upon the baffles and be led off through the discharge 12a so that there is no chance of its contaminating the purified oil in the tank 14.

Thus without building up any pressure which would be reactive on the exhaust 1, I remove the vaporizable content of the oils of the discharge and convey it from the presence of the oil as it falls for collection in the tank 14.

The cooling system 15 takes care at low cost of the heat introduced at the hot bulb 10. It is much more economical than the former purifying steps necessary before such oil could be returned to the pump.

The bulb 10 may be variously shaped but is highly efficient as a chamber of ovate cross section. As shown in Fig. 4, the bulb 10 is circular in plan view and is of such diameter that it practically divides the casing 11 into an upper vaporizing chamber 11a and a lower oil cooling and collecting chamber 11b.

The bulb 10 is supported by brackets 20 extending from the casing wall which brackets space the bulb from the wall a distance to permit the oil separated from the exhaust to pass down into chamber 11b over the cooling coils 15. As shown in Fig. 6, the bulb 10 is so positioned with respect to the baffles 12 that no appreciable amount of condensate can fall upon it, and any that does fall will be revaporized instead of passing along with the reclaimed oil into the chamber 11b. As shown, the bulb 10 is ovate in vertical cross section and presents a convex surface to the exhaust delivery, over which surface the purified oil flows outwardly and downwardly to the edge of the bulb from which it drops into the the lower chamber 11b which contains the cooling coils 15 and oil collector 14. In Fig. 2 I have indicated a simple but efficient basis of electrical heating of the bulb 10. In Fig. 6 it is indicated as having connections as at 16 as for steam or like heating media.

In Fig. 2 the bulb 10 is indicated beneath the downward discharge 1 and fitted with an electric unit 20. This may be of any standard make equivalent to a G. E. Caleriod or any other comparable commercial unit. Such usually have thermal coils as 21 controlled by a switch 22 taking current as from 23. It may be located in an expansion pipe 24 filled as at 25. Such a simple heating basis is advantageous where the power cost is favorable, but usually there is available steam at by-product cost.

Within the casing 11 above the hot bulb 10 there is arranged a series of conic baffle plates 12 with which the exhaust gases and any contained oil and vapors successively contact to condense thereon and pass to the sump through the discharge 12a. The oil impinged on the hot bulb 10 falls by gravity to the oil stabilizing reservoir 14.

It is important that the area of the openings between the baffle plates be substantial to permit the passage of the exhaust gases in such manner as to maintain substantially atmospheric pressure in all parts of the casing 11. The exhaust gases as from the vacuum pump 2 are at a relatively high temperature having passed through a state of compression in the vacuum pump.

The baffles 12 are supported by but slightly spaced from the casing wall 11. Of these, the topmost and every second lower baffle 12' is in the form of a cone, and between these are other baffles in the form of truncated cones 12''. The baffles 12' are carried by brackets 17 welded to the wall of the casing 11, and the baffles 12'' are welded to spaced rods or irons 18 extending vertically of and inwardly from the casing wall 11. (Fig. 6.) Condensate on these baffles flows outwardly towards the wall 11 and downwardly between the edges of the baffles and the wall until it reaches the collector formed by the lowermost baffle 12c which is welded directly to the casing wall and from which the condensate escapes through the outlet 12a.

I locate water coils 15 in the reservoir 14 to cool the precipitated oils and to facilitate the initial separation by condensation. These further help to maintain an atmosphere in the oil stabilizing chamber 14 having a relatively low vapor tension in order to facilitate the separation of the air from the recovered oil, and to minimize if not eliminate any frothing or foaming tendency of the impinged oil when being separated from the exhaust gases.

The details of my separator may be varied according to the engineering needs of different systems and it may be variously connected up in such systems to meet the operating requirement of different plants.

What I therefore claim and desire to secure by Letters Patent is:

1. Apparatus for recovering oil from exhaust mixtures comprising a casing open to atmosphere, a heating unit therein of a shape and size substantially to divide the casing into upper and lower chambers but spaced from the casing walls to permit the passage of purified oil past said heating unit into said lower chamber, means delivering the exhaust above the heating unit, baffles mounted in said casing over said heating unit to effect the downward passage of condensate while permitting the upward passage of vapors, and a collector for said condensate above said heating unit and designed to prevent said condensate from falling upon said heating unit.

2. The apparatus of claim 1, the heating unit comprising a housing presenting a convex upper surface to the exhaust delivery means, and a heat source within said housing.

3. The apparatus of claim 1, the heating unit comprising a housing substantially ovate in vertical cross-section, a heat source within said housing, and means carried by the casing wall for supporting and spacing said housing from the casing wall.

HAROLD I. STOLTZ.